US007094715B2

United States Patent
Sakaguchi et al.

(10) Patent No.: US 7,094,715 B2
(45) Date of Patent: Aug. 22, 2006

(54) NON-HALOGEN SERIES FLOOR MATERIAL

(75) Inventors: Eiji Sakaguchi, Nara (JP); Makoto Koyama, Nara (JP); Junichi Takeda, Nara (JP); Yoshiharu Nishino, Nara (JP); Hiroaki Ishii, Nara (JP)

(73) Assignee: Suminoe Textile Co., LTD, Osaka (JP)

( * ) Notice: Subject to any disclaimer, the term of this patent is extended or adjusted under 35 U.S.C. 154(b) by 48 days.

(21) Appl. No.: 10/695,450

(22) Filed: Oct. 29, 2003

(65) Prior Publication Data

US 2005/0095412 A1 May 5, 2005

(51) Int. Cl.
*B32B 5/06* (2006.01)
*B32B 5/26* (2006.01)

(52) U.S. Cl. .................... 442/398; 442/417; 428/332; 428/337; 428/338; 428/339

(58) Field of Classification Search ............... 442/398, 442/417; 428/332, 337, 338, 339
See application file for complete search history.

(56) References Cited

FOREIGN PATENT DOCUMENTS

| JP | 2000103022 A | * | 4/2000 |
| JP | 2002052654 A | * | 2/2002 |
| WO | WO 200226879 A1 | * | 4/2002 |

* cited by examiner

*Primary Examiner*—Elizabeth M. Cole
(74) *Attorney, Agent, or Firm*—Watchstone P+D, LLC; Stephen B. Parker, Esq.

(57) ABSTRACT

A non-halogen series floor material includes a first intermediate resin layer containing filler of 100 to 400 mass parts with respect to resin ingredient of 100 mass parts, the resin ingredient consisting essentially of resin having no chlorine atom in chemical structure, a surface resin layer integrally formed at an upper surface side of the first intermediate resin layer, the surface resin layer containing resin having no chloride atom in chemical structure and having a thickness of 100 to 1,000 μm, a second intermediate resin layer integrally formed at a lower surface side of the first intermediate resin layer, the second intermediate resin layer containing resin having no chloride atom in chemical structure and filler of 0 to 200 mass parts with respect to resin ingredient of 100 mass parts, and a backing layer integrally formed at a lower surface side of the second intermediate resin layer, the backing layer being formed of a fibrous fabric constituted by fibers containing resin having no chloride atom in chemical structure. A content ratio of the filler in the second intermediate resin layer with respect to the resin ingredient thereof is smaller than a content ratio of the filler in the first intermediate resin layer with respect to the resin ingredient thereof. A thickness of the second intermediate resin layer is 100 μm or more. A thickness of the second intermediate resin layer is 50% or less of a total thickness of three resin layers.

20 Claims, 1 Drawing Sheet

NON-HALOGEN SERIES FLOOR MATERIAL

BACKGROUND OF THE INVENTION

1. Field of the Invention

The present invention relates to a non-halogen series floor material. More specifically, the present invention relates to a non-halogen series floor material preferably used as a floor material for use in architectural structures such as buildings, condominiums and commercial facilities or a floor material for use in vehicles such as trains or buses.

2. Description of Related Art

The following description sets forth the inventor's knowledge of related art and problems therein and should not be construed as an admission of knowledge in the prior art.

Conventionally, as a floor material (a tile-like floor material or sheet-like floor material) for use in architectural structures such as buildings, condominiums or commercial facilities or a floor material for use in vehicles such as trains or buses, a floor material made of polyvinyl chloride (PVC) resin is widely used.

However, a PVC floor material generates a large amount of smoke and poisonous gases such as hydrogen chloride at the time of burning. Accordingly, this causes difficulties from the viewpoint of disaster prevention because evacuees may inhale such poisonous gases at the time of fire disaster and also causes environment pollution when incinerating such floor materials. Furthermore, since such a PVC floor material contains a large amount of plasticizer, there are problems that the floor material emits specific odor, the flexibility as a floor material gradually deteriorates as the plasticizer evaporates and the appearance gradually deteriorates since the plasticizer gradually causes dull deposits on the surface of the floor material.

Recently, there is a proposal that a material that generates less poisonous gases at the time of burning is used as a floor material in place of the aforementioned PVC material.

However, in the proposed floor material, in cases where filler is not added to the surface side of the floor material or the amount of filler is decreased at the surface side thereof for the purpose of increasing the abrasion resistance, the so-called valley warping phenomenon (a phenomenon in which edge side portions warp upward with respect to the central portion) of the floor material causes remarkably, which deteriorates the workability. As a result, the proposed floor material is inferior to the aforementioned PVC floor material.

SUMMARY OF THE INVENTION

It is an object of the present invention to provide a non-halogen floor material that hardly generates poisonous gases at the time of burning and is excellent in wear resistance, stain resistance, dimensional stability and workability.

According to a preferable embodiment of the present invention, a non-halogen series floor material, includes:

a first intermediate resin layer containing filler of 100 to 400 mass parts with respect to resin ingredient of 100 mass parts, the resin ingredient consisting essentially of resin having no chlorine atom in chemical structure;

a surface resin layer integrally formed at an upper surface side of the first intermediate resin layer, the surface resin layer containing resin having no chloride atom in chemical structure and having a thickness of 100 to 1,000 μm;

a second intermediate resin layer integrally formed at a lower surface side of the first intermediate resin layer, the second intermediate resin layer containing resin having no chloride atom in chemical structure and filler of 0 to 200 mass parts with respect to resin ingredient of 100 mass parts; and a backing layer integrally formed at a lower surface side of the second intermediate resin layer, the backing layer being formed of a fibrous fabric constituted by fibers containing resin having no chloride atom in chemical structure, wherein a content ratio of the filler in the second intermediate resin layer with respect to the resin ingredient of the second intermediate resin layer is smaller than a content ratio of the filler in the first intermediate resin layer with respect to the resin ingredient of the first intermediate resin layer, wherein a thickness of the second intermediate resin layer is 100 μm or more, and wherein a thickness of the second intermediate resin layer is 50% or less of a total thickness of three resin layers of the surface resin layer, the first intermediate resin layer and the second intermediate resin layer.

According to this floor material, since resin having no chlorine atom in chemical structure is mainly used, the floor material generate less poisonous gases at the time of burning, which is excellent in burning safety and environment conservation.

Furthermore, since the surface resin layer is made of resin, the surface of the floor material is excellent in wear resistance and stain resistance. In addition, since the thickness of the surface resin layer is set to fall within the range of 100 to 1,000 μm, the up-curvature generation prevention can be improved while securing the excellent wear resistance.

Further, since the first intermediate resin layer contains a certain amount of filler, the floor material is excellent in dimensional stability.

Furthermore, since the second intermediate resin layer is integrally formed at the lower surface side of the first intermediate resin layer, a content ratio of the filler in the second intermediate resin layer with respect to the resin ingredient of the second intermediate resin layer is smaller than a content ratio of the filler in the first intermediate resin layer with respect to the resin ingredient of the first intermediate resin layer, and that a thickness of the second intermediate resin layer is 100 μm or more but 50% or less of a total thickness of three resin layers of the surface resin layer, the first intermediate resin layer and the second intermediate resin layer, the generation of up-curvature of the floor material can be effectively prevented, resulting in excellent workability.

Furthermore, a backing layer made of a fibrous fabric is formed at the lower surface side of the second intermediate resin layer. Therefore, at the time of mounting the floor material, adhesive agent (adhesive agent for securing the floor material to a surface of a mounting floor substrate) can be permeated by the fibrous fabric, causing excellent adhesive strength by the so-called anchor effect. In other words, the floor material can be secured to the mounting floor substrate while keeping enough adhesive strength. In addition, since it is not required to contain plasticizer, the specific odor will not emit and that dull deposits will not generate on the surface of the floor material even if it is used for years. Further, it is excellent in durability.

It is preferable that the surface resin layer is a monolayer structure containing olefin series resin as a main resin ingredient or a lamination structure in which at least the uppermost surface layer contains olefin series resin as a main resin ingredient. The employment of the olefin series resin dramatically improves the wear resistance and the stain resistance of the floor surface.

It is more preferable that the surface resin layer is a monolayer structure containing polypropylene resin as a main resin ingredient or a lamination structure in which at least the uppermost surface layer contains polypropylene resin as a main resin ingredient. Since at least the uppermost surface layer of the surface resin layer contains polypropylene resin as a main resin ingredient, the stain resistance and the wear resistance can be further enhanced.

Furthermore, it is preferable that the following formula is satisfied: $1.0 < X/Y \leq 2.0$, where "X" is a degree of elasticity of the second intermediate resin layer, and "Y" is a degree of elasticity of the surface resin layer. In this case, the generation of down-curvature of the floor material can be prevented more effectively, and the floor material becomes a slightly up-curved state (a state in which the edge sides of the floor material are curved downwardly with respect to the central portion of the floor material), which further improves the workability.

Especially, it is more preferable that the following formula is satisfied: $1.1 \leq X/Y \leq 1.5$. In this case, the generation of down-curvature of the floor material can be prevented assuredly, and the floor material becomes an appropriate up-curved state, which further improves the workability.

From the view point of securing the adhesiveness between the floor material and the mounting floor substrate, it is preferable that the weight per unit area of the backing layer is 30 to 100 g/m$^2$.

Other objects and the features will be apparent from the following detailed description of the present invention with reference to the attached drawings.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The accompanying figures are provided by way of example, without limiting the broad scope of the invention or various other embodiments, wherein.

DETAILED DESCRIPTION OF THE PREFERRED EMBODIMENTS

Figure 1:
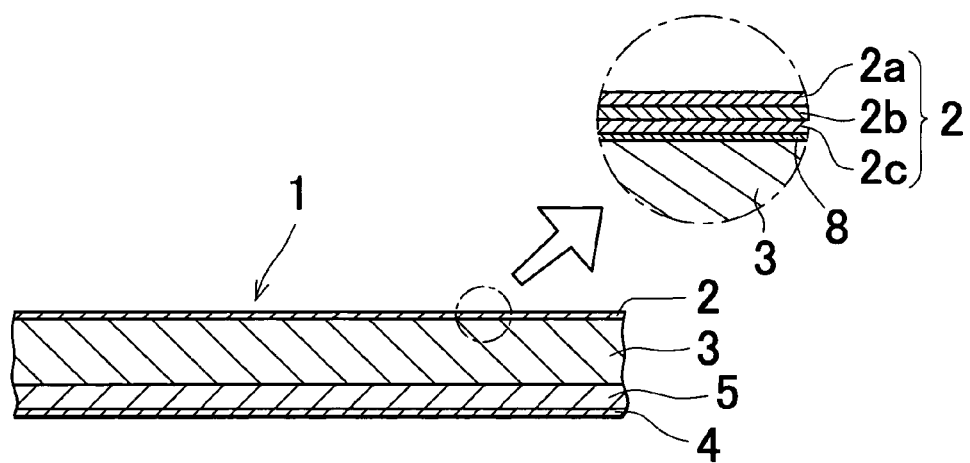
FIG. 1 is a cross-sectional view showing a floor material according to an embodiment of the present invention.

One embodiment of a non-halogen series floor material according to the present invention will be explained with reference to the attached drawing.

This non-halogen series floor material 1 has a lamination structure including a first intermediate resin layer 3, a surface resin layer 2, a second intermediate resin layer 5 and a backing layer 4. The first intermediate resin layer 3 contains filler of 100 to 400 mass parts with respect to resin ingredient of 100 mass parts, and the resin ingredient consists essentially of resin having no chlorine atom in chemical structure. The surface resin layer 2 is integrally formed at an upper surface side of the first intermediate resin layer 3. The surface resin layer 2 contains resin having no chloride atom in chemical structure and has a thickness of 100 to 1,000 μm. The second intermediate resin layer 5 is integrally formed at a lower surface side of the first intermediate resin layer 3. The second intermediate resin layer 5 contains resin having no chloride atom in chemical structure and filler of 0 to 200 mass parts with respect to resin ingredient of 100 mass parts. The backing layer 4 is integrally formed at a lower surface side of the second intermediate resin layer 5. The backing layer 4 is formed of a fabric constituted by fibers containing resin having no chloride atom in chemical structure.

The surface resin layer 2 is made of resin composite containing resin having no chlorine atom in chemical structure. In this specification, the aforementioned "resin composite" includes composite constituted by resin only. Since the surface resin layer 2 is made of such resin, the surface of the floor material 1 is excellent in wear resistance and stain resistance. Furthermore, since the resin has no chlorine atom in chemical structure, poisonous gases hardly generate at the time of burning.

The resin constituting the surface resin layer 2 and having no chloride atom in chemical structure is not limited to a specific one. For example, thermoplastic resin such as polypropylene resin, polyethylene resin or amorphous poly α-olefin resin, or thermoplastic elastomer such as olefin series thermoplastic elastomer or styrene series thermoplastic elastomer can be preferably used. Especially, it is preferable to use olefin series resin as a main ingredient of the resin component since this resin can improve the wear resistance and the stain resistance of the surface of the floor material 1.

The surface resin layer 2 can be a monolayer structure or a multilayer structure so long as the surface resin layer is made of the aforementioned resin composite. Especially, it is preferable that the surface resin layer 2 is a monolayer structure containing polypropylene resin as a main resin ingredient or a lamination structure in which at least the uppermost surface layer contains polypropylene resin as a main resin ingredient. In this case, since the uppermost layer of the surface resin layer contains polypropylene resin as a main resin ingredient, even if dart is adhered to the surface, such dart can be easily wiped away, which further enhances the stain resistance and the wear resistance. Concretely, a monolayer structure made of polypropylene resin, a triple-layer structure including an uppermost layer 2a made of polypropylene resin, an intermediate layer 2b made of mixed resins of polypropylene resin and amorphous poly α-olefin resin and a lowermost layer 2c made of polyethylene resin as shown in FIG. 1 can be exemplified.

The thickness of the surface resin layer 2 should be 100 to 1,000 μm because of the following reasons. If the thickness is less than 100 μm, the wear resistance deteriorates. To the contrary, if the thickness exceeds 1,000 μm, the floor material 1 tends to cause a slight U-shape deformation, and the dimensional stability also deteriorates. Especially, it is preferable that the thickness falls within the range of 200 to 600 μm.

Regarding the surface resin layer 2, it is not excluded such a structure that filler and/or another additives (e.g., pattern-forming members) are contained. In this surface resin layer 2, however, it is preferable to employ such a structure that filler is not contained in at least the upper surface portion/layer. This further improves the wear resistance.

Furthermore, as circumstances demand, a film or coating can be formed on the upper surface of the surface resin layer 2. Such a film or coating can be formed, for example, by applying treating agent. For instance, from the view point of improving the wear resistance, a film or coating containing urethane series resin or acrylic series resin as main ingredient can be formed on the upper surface of the surface resin layer 2. In general, such a film or coating is formed to have a thickness of 50 µm or less.

Figure 2:
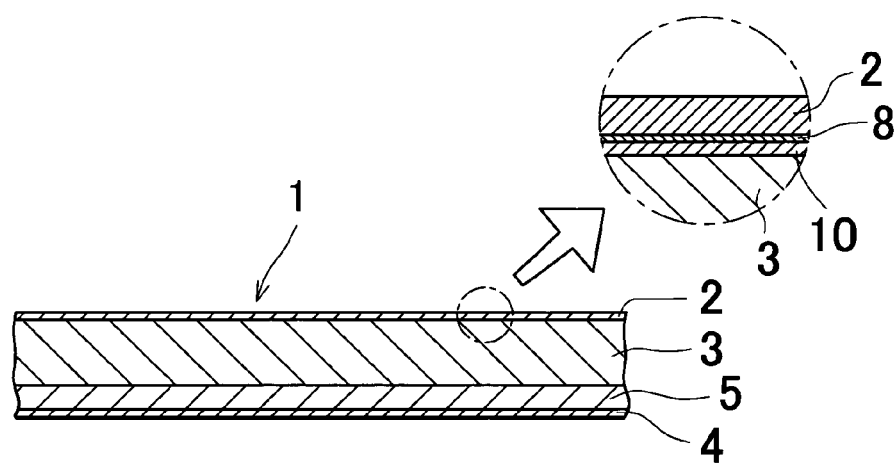
FIG. 2 is a cross-sectional view showing a floor material according to another embodiment of the present invention.

For the purpose of improving the ornamentation, a print design can be given to the upper or lower surface of the surface resin layer 2 or within the surface resign layer 2. However, the means for giving ornamentation is not be limited to the above so long as a print design can be seen from the surface side of the floor material 1. Especially, it is more preferable to laminate a print layer 8 such as a pattern printed layer on the lower surface of the surface resin layer 2 as shown in FIG. 1. In this case, the print layer 8 can be prevented from being damaged or exfoliated during the usage, resulting in long-life excellent ornamentation. In cases where the first intermediate resin layer 3 is colored, if a print layer 8 is disposed between the surface resin layer 2 and a thin white colored film layer 10 as shown in FIG. 2, the print layer 8 is hardly affected by the coloring of the first intermediate resin layer 3, resulting in excellent design. The printing method for giving print patterns or the like is not limited to a specific one, and can be, for example, an ink jet printing method, a gravure printing method, a screen printing method or a transfer printing method.

As another means for improving the ornamentation, a means for mixing pattern-forming members within the first intermediate resin layer 3 can be exemplified. By mixing such pattern-forming members in the first intermediate resin layer 3, the pattern-forming members can be seen in a randomly mixed manner via the transparent or half-transparent surface resin layer 2, causing a deep pattern.

The aforementioned pattern-forming member is not limited to a specific one, but can be any known pattern-forming member. Preferably pattern-forming members include, for example, a grain member made of thermosetting urea resin or thermoplastic polyester resin, an angular or flake-shaped chip made of cellulose or aluminum as a main ingredient and a needle-like member made of cellulose as a main ingredient. These pattern-forming members can be used in an independent manner or in a combined manner.

In cases where such pattern-forming members are to be mixed, it is preferable that the mixing amount is 30 mass % or less, more preferably 10 mass % or less, with respect to the entire mass of the first intermediate resin layer 3. If the mixing amount of pattern-forming members exceeds 30 mass %, it is not preferable because it may become difficult to obtain a deep and beautiful pattern.

In place of pattern-forming members or in addition to pattern-forming members, coloring pigment can be mixed in the first intermediate resin layer 3. In cases where coloring pigment is to be mixed, it is preferable to control so that the mixing amount falls within the range of 0.1 to 5 mass % with respect to the entire weight of the first intermediate resin layer 3 because of the following reasons. If the amount is less than 0.1 mass %, enough coloring cannot be obtained. To the contrary, if the amount exceeds 5 mass %, the property of the first intermediate resin layer 3 may deteriorate. In addition to the above, the surface resin layer 2 may have a patterned uneven surface.

The aforementioned first intermediate resin layer 3 is composed of resin component containing filler of 100 to 400 mass parts with respect to resin ingredient of 100 mass parts. The resin component consists essentially of resin having no chlorine atom in chemical structure. Since this first intermediate resin layer 3 contains the aforementioned certain amount of filler, the floor material 1 is excellent in dimensional stability. Furthermore, since this first intermediate resin layer 3 is essentially composed of resin having no chlorine atom in chemical structure as resin ingredient, poisonous gases hardly generate at the time of burning. However, in cases where the amount of filler containing the first intermediate resin layer 3 is less than the lower limit, it becomes difficult to obtain enough dimensional stability. On the other hand, in cases where the amount of filler exceeds the upper limit, the flexibility as a floor material deteriorates. It is more preferable that the first intermediate resin layer 3 is composed of only resin having no chlorine atom in chemical structure.

The aforementioned second intermediate resin layer 5 is composed of resin component containing resin having no chloride atom in chemical structure and filler of 0 to 200 mass parts with respect to resin ingredient of 100 mass parts. In other words, this second intermediate resin layer 5 is composed of either (a) resin having no chloride atom in chemical structure and having no filler or (b) resin having no chloride atom in chemical structure and having filler of 200 mass parts or less with respect to resin ingredient of 100 mass parts. By controlling the amount of filler to be 0 or not larger than 200 mass parts, generation of up-curvature of the floor material can be prevented effectively, resulting in improved workability. To the contrary, if the amount of filler exceeds 200 mass parts, it becomes difficult to obtain an effect of preventing generation of up-curvature, resulting in deteriorated workability. It is preferable that the second intermediate resin layer contains filler of 0 to 100 mass parts with respect to resin ingredient of 100 mass parts.

It is necessary to set that the content ratio of the filler in the second intermediate resin layer 5 with respect to the resin ingredient of the second intermediate resin layer 5 is less than the content ratio of the filler in the first intermediate resin layer 3 with respect to the resin ingredient of the first intermediate resin layer 3. When these conditions are satisfied, an effect causing an upward warp of the floor material 1 can be obtained, which in turn can effectively prevent a downward warp of the floor material 1 and therefore the floor material 1 can be slightly upward warped state. As a result, the workability can be improved. Especially, it is preferable that the content ratio of the filler in the second intermediate resin layer 5 with respect to the resin ingredient of the second intermediate resin layer 5 is less than one half of the content ratio of the filler in the first intermediate resin layer 3 with respect to the resin ingredient of the first intermediate resin layer 3.

The thickness of the second intermediate resin layer 5 should be 100 µm or more and 50% or less of the total thickness of three resin layers of the surface resin layer 2, the first intermediate resin layer 3 and the second intermediate resin layer 5. By setting the thickness of the second intermediate resin layer 5 as mentioned above, the downward warping of the floor material 1 can be prevented more effectively, which in turn can effectively improve the workability. If the thickness is less than 100 µm, it becomes difficult to obtain an effect of causing an upward warping of the floor material 1, which deteriorates the workability. To the contrary, if the thickness exceeds 50% of the total thickness of three resin layers 2, 3 and 5, the upward warping of the floor material 1 becomes excessive and the dimensional stability deteriorates. It is preferable that a thickness of the second intermediate resin layer 5 is 200 µm or more but 30% or less of the total thickness of three resin layers of the surface resin layer 2, the first intermediate resin layer 3 and the second intermediate resin layer 5.

It is preferable that the total thickness of the first intermediate resin layer 3 and the second intermediate resin layer 5 is set to be 1 to 5 mm because of the following reasons. If the total thickness is less than 1 mm, it is difficult to obtain sufficient dimensional stability. To the contrary, if the total thickness exceeds 5 mm, the total weight increases, which in turn causes deterioration of the handling and that of the workability. It is more preferable that the total thickness of the two resin layers 3 and 5 is set so as to fall within the range from 1.5 to 4 mm.

It is preferable that the following formula is satisfied: $1.0<X/Y\leq 2.0$, where "X" is a degree of elasticity of the second intermediate resin layer 5, and "Y" is a degree of elasticity of the surface resin layer 2.

In cases where this relation is satisfied, the generation of downward warping of the floor material 1 can be prevented more effectively. This causes a slight upward warping of the floor material 1, further improving the workability of the floor material 1, which in turn can provide a floor material 1 of higher quality. If the ratio of X/Y is 1.0 or less, it is not preferable since it becomes difficult to assuredly prevent the possibility that the floor material 1 warps slightly downward. On the other hand, if the ratio of X/Y exceeds 2.0, it is not preferable since the floor material 1 tends to excessively warp upward. It is more preferable that the following formula is satisfied: $1.1\leq X/Y\leq 1.5$.

The aforementioned "degree of elasticity" is a numerical value obtained by a tensile test of the second intermediate resin layer 5 or the surface resin layer 2 performed in the longitudinal direction (not in the thickness direction). This tensile test is performed in accordance with JIS Z1702 on the conditions that the test piece width is 15 mm, the distance between chucks is 100 mm and the tensile rate is 50 mm/min.

The resin having no chlorine atom in chemical structure constituting the first intermediate resin layer 3 or the second intermediate resin layer 5 is not limited to a specific one, but can be (a) thermoplastic resin such as homo-polypropylene resin, block-polypropylene resin, random polypropylene resin, low density polyethylene resin, very low density polyethylene resin, high-density polyethylene resin, linear polyethylene resin, polyolefin resin using metallocene catalyst, ethylene-vinyl acetate copolymer, ethylene series copolymer such as amorphous ethylene-α olefin copolymer, (b) thermoplastic elastomer such as olefin series thermoplastic elastomer including a flexibility layer made of ethylene-propylene rubber and a hard layer made of polyethylene resin or polypropylene resin or styrene series thermoplastic elastomer, or (c) rubber series component such as styrene-butadiene rubber, isoprene rubber, chloroprene rubber. Especially, olefin series resin can be suitably used as the resin having no chlorine atom in chemical structure constituting the first intermediate resin layer 3 and the second intermediate resin layer 5.

The filler is not limited to a specific one, and can be a conventional known filler for a floor material. For example, calcium carbonate, barium sulfate, aluminum hydroxide, magnesium hydroxide, clay, talc, alumina, silica, etc. can be exemplified as the filler. In cases where aluminum hydroxide or magnesium hydroxide is used, incombustibility can be given.

Each of the surface resin layer 2, the first intermediate resin layer 3 and the second intermediate resin layer 5 can include various additives such as antioxidant, ultraviolet-absorption agent, lubricant, thermal stabilizer, light stabilizer, flame retarder, colorant, antistatic agent, pattern agent (for the purpose of improving the design).

The backing layer 4 is a formed by integrally laminating fibrous fabric consisting of fibers containing resin having no chloride atom in chemical structure on the lower surface of the second intermediate resin layer 5. At the time of laying the floor material 1, adhesives (for securing the floor material 1 on a floor substrate surface) are permeated into the fibrous fabric, causing an anchor effect. As a result, excellent adhesive strength can be obtained.

As the aforementioned fibrous fabric, for example, knitted fabric, woven fabric and nonwoven fabric can be exemplified. Concretely, as the knitted fabric, victoria lawn can be exemplified. As the nonwoven fabric, polypropylene nonwoven fabric, polyester nonwoven fabric and nylon nonwoven fabric can be exemplified. Especially, from the view point of increasing the adhesive strength against the floor substrate, it is preferable to use nonwoven fabric. Among nonwoven fabrics, it is more preferable to use a spunbonded nonwoven fabric that can be formed into thinner layers. The most preferable one is polypropylene spunbonded fabric.

It is preferable that the weight per unit area of the backing layer 4 falls within the range of 30 to 100 $g/m^2$ because of the following reasons. If it is less than 30 $g/m^2$, it becomes difficult to obtain sufficient anchor effect, resulting in excellent adhesive strength with respect to the floor substrate. To the contrary, if it exceeds 100 $g/m^2$, the backing layer 4 causes material breaking easily, which in turn becomes difficult to obtain sufficient adhesive strength.

Although the thickness of this non-halogen series floor material 1 according to the present invention is not limited, it generally falls within the range of 2 to 6 mm. Furthermore, the floor material 1 can be a tile-like floor material or a sheet-like floor material (for example, a long sheet-like material with a width of about 600 to 2,500 mm). However, it is not specifically limited to the above.

The method for manufacturing the non-halogen series floor material 1 according to the present invention is not specifically limited, and the non-halogen series floor material 1 can be manufactured by any known apparatus such as a calendar machine or an extruder or any other known laminating techniques such as a hot-lamination machine. Furthermore, the lamination order of the materials is not specifically limited.

Next, concrete examples of the present invention will be explained.

EXAMPLE 1

As shown in Table 1, the compounds including 24 mass parts of amorphous poly α-olefin resin, 32 mass parts of ethylene-propylene rubber, 44 mass parts of polypropylene, 300 mass parts of calcium carbonate, 2 mass parts of lubricant (phosphate ester series) were mixed with a Banbury mixer, and then made into a first intermediate sheet (first intermediate resin layer) of 1.4 mm thickness by using a calendar making machine.

Furthermore, the compounds including 24 mass parts of ethylene-propylene rubber, 70 mass parts of polypropylene, 6 mass parts of styrene series thermoplastic elastomer, 25 mass parts of calcium carbonate, 1 mass parts of lubricant (phosphate ester series) were mixed with a Banbury mixer, and then made into a second intermediate sheet (second intermediate resin layer) of 200 μm thickness by using a calendar making machine. The measured degree of elasticity X of this second intermediate sheet was 316 $N/mm^2$.

On the other hand, a 300 μm thick surface sheet (surface resin layer) with a triple layer structure (each layer having the same thickness) including an upper layer/an intermediate layer/a lower layer=a polypropylene (PP) resin layer/an olefin series resin layer (mixed resin layer of PP and amorphous poly α-olefin resin)/a polypropylene (PP) resin layer was formed by using a co-extruder, and a predetermined pattern was printed on the lower surface thereof by a gravure printing method to thereby obtain an upper layer sheet. The measured degree of elasticity Y of this surface sheet before being printed sheet was 378 N/mm².

The aforementioned upper sheet, the aforementioned first intermediate sheet, the second intermediate sheet and a polypropylene span bond nonwoven fabric (the weight per unit area: 40 g/m²) were laminated in this order at 150° C. by using a hot lamination machine to thereby obtain a floor material with a thickness of 2.0 mm.

EXAMPLES 2~8

A floor material was obtained in the same manner as Example 1 except for the conditions such as composition, thickness, etc. of each layer. These conditions are shown in Tables 2 to 8.

EXAMPLE 9

A floor material was obtained in the same manner as Example 1 except for the structure of the surface resin layer. The surface resin layer was a polyproplene single layer (with printing on the lower surface thereof).

TABLE 1

Example 1

| | | |
|---|---|---|
| Surface resin layer | Composition | Triple layer structure PP/Olefin resin/PP (with printing on rear surface) |
| | Thickness | 300 μm |
| | Degree of elasticity(Y) | 316 N/mm² |
| First intermediate resin layer | Composition | Amorphous poly α-olefin resin: 24 mass parts Ethylene- propylene rubber: 32 mass parts Polypropylene: 44 mass parts Calcium carbonate: 300 mass parts Lubricant: 2 mass parts |
| | Thickness | 1.4 mm |
| Second intermediate resin layer | Composition | Ethylene- propylene rubber: 24 mass parts Polypropylene: 70 mass parts Styrene series thermoplastic elastomer: 6 mass parts Calcium carbonate: 25 mass parts Lubricant: 1 mass parts |
| | Thickness | 200 μm |
| | Degree of elasticity(X) | 378 N/mm² |
| Backing layer | Material Weight per unit area | Polypropylene spunbonded fabric 40 g/m² |
| X/Y | | 1.2 |

TABLE 2

Example 2

| | | |
|---|---|---|
| Surface resin layer | Composition | Triple layer structure PP/Olefin resin/PP (with printing on rear surface) |

TABLE 2-continued

Example 2

| | | |
|---|---|---|
| | Thickness | 200 μm |
| | Degree of elasticity(Y) | 190 N/mm² |
| First intermediate resin layer | Composition | Amorphous poly α-olefin resin: 24 mass parts Ethylene-propylene rubber: 32 mass parts Polypropylene: 44 mass parts Calcium carbonate: 300 mass parts Lubricant: 2 mass parts |
| | Thickness | 1.1 mm |
| Second intermediate resin layer | Composition | Amorphous poly α-olefin resin: 10 mass parts Ethylene-propylene rubber: 50 mass parts Polypropylene: 40 mass parts Calcium carbonate: 100 mass parts Lubricant: 2 mass parts |
| | Thickness | 0.6 mm |
| | Degree of elasticity(X) | 210 N/mm² |
| Backing layer | Material Weight per unit area | Polypropylene spunbonded fabric 40 g/m² |
| X/Y | | 1.1 |

TABLE 3

Example 3

| | | |
|---|---|---|
| Surface resin layer | Composition | Triple layer structure PP/PE/PP (with printing on rear surface) |
| | Thickness | 500 μm |
| | Degree of elasticity(Y) | 511 N/mm² |
| First intermediate resin layer | Composition | Amorphous poly α-olefin resin: 24 mass parts Ethylene-propylene rubber: 32 mass parts Polypropylene: 44 mass parts Calcium carbonate: 300 mass parts Lubricant: 2 mass parts |
| | Thickness | 1.1 mm |
| Second intermediate resin layer | Composition | Ethylene-propylene rubber: 14 mass parts Polypropylene: 80 mass parts Styrene series thermoplastic elastomer: 6 mass parts Calcium carbonate: 10 mass parts Lubricant: 1 mass parts |
| | Thickness | 300 μm |
| | Degree of elasticity(X) | 662 N/mm² |
| Backing layer | Material Weight per unit area | Polypropylene spunbonded fabric 40 g/m² |
| X/Y | | 1.3 |

TABLE 4

Example 4

| | | |
|---|---|---|
| Surface resin layer | Composition | Triple layer structure PP/Olefin resin/PP (with printing on rear surface) |
| | Thickness | 300 μm |
| | Degree of elasticity(Y) | 316 N/mm² |
| First intermediate resin layer | Composition | Amorphous poly α-olefin resin: 24 mass parts Ethylene-propylene rubber: |

TABLE 4-continued

Example 4

|  |  |  |
|---|---|---|
|  |  | 32 mass parts<br>Polypropylene: 44 mass parts<br>Calcium carbonate: 300 mass parts<br>Lubricant: 2 mass parts |
|  | Thickness | 1.3 mm |
| Second intermediate resin layer | Composition | Ethylene-propylene rubber: 24 mass parts<br>Polypropylene: 70 mass parts<br>Styrene series thermoplastic elastomer: 6 mass parts<br>Calcium carbonate: 25 mass parts<br>Lubricant: 1 mass parts |
|  | Thickness | 300 μm |
|  | Degree of elasticity(X) | 384 N/mm$^2$ |
| Backing layer | Material | Polyester spunbonded fabric |
|  | Weight per unit area | 40 g/m$^2$ |
| X/Y |  | 1.2 |

TABLE 5

Example 5

|  |  |  |
|---|---|---|
| Surface resin layer | Composition | Triple layer structure PP/Olefin resin/PP (with printing on rear surface) |
|  | Thickness | 400 μm |
|  | Degree of elasticity(Y) | 325 N/mm$^2$ |
| First intermediate resin layer | Composition | Amorphous poly α-olefin resin: 24 mass parts<br>Ethylene-propylene rubber: 32 mass parts<br>Polypropylene: 44 mass parts<br>Calcium carbonate: 300 mass parts<br>Lubricant: 2 mass parts |
|  | Thickness | 1.2 mm |
| Second intermediate resin layer | Composition | Ethylene-propylene rubber: 24 mass parts<br>Polypropylene: 70 mass parts<br>Styrene series thermoplastic elastomer: 6 mass parts<br>Calcium carbonate: 25 mass parts<br>Lubricant: 1 mass parts |
|  | Thickness | 300 μm |
|  | Degree of elasticity(X) | 384 N/mm$^2$ |
| Backing layer | Material | Polypropylene spunbonded fabric |
|  | Weight per unit area | 70 g/m$^2$ |
| X/Y |  | 1.2 |

TABLE 6

Example 6

|  |  |  |
|---|---|---|
| Surface resin layer | Composition | Triple layer structure PP/Olefin resin/PP (with printing on rear surface) |
|  | Thickness | 300 μm |
|  | Degree of elasticity(Y) | 316 N/mm$^2$ |
| First intermediate resin layer | Composition | Amorphous poly α-olefin resin: 24 mass parts<br>Ethylene-propylene rubber: 32 mass parts<br>Polypropylene: 44 mass parts<br>Calcium carbonate: 300 mass parts<br>Lubricant: 2 mass parts |
|  | Thickness | 1.4 mm |
| Second intermediate resin layer | Composition | Ethylene-propylene rubber: 54 mass parts<br>Polypropylene: 40 mass parts<br>Styrene series thermoplastic elastomer: 6 mass parts<br>Calcium carbonate: 25 mass parts<br>Lubricant: 1 mass parts |
|  | Thickness | 200 μm |
|  | Degree of elasticity(X) | 221 N/mm$^2$ |
| Backing layer | Material | Polypropylene spunbonded fabric |
|  | Weight per unit area | 40 g/m$^2$ |
| X/Y |  | 0.7 |

TABLE 7

Example 7

|  |  |  |
|---|---|---|
| Surface resin layer | Composition | Triple layer structure PP/Olefin resin/PP (with printing on rear surface) |
|  | Thickness | 300 μm |
|  | Degree of elasticity(Y) | 140 N/mm$^2$ |
| First intermediate resin layer | Composition | Amorphous poly α-olefin resin: 24 mass parts<br>Ethylene-propylene rubber: 32 mass parts<br>Polypropylene: 44 mass parts<br>Calcium carbonate: 300 mass parts<br>Lubricant: 2 mass parts |
|  | Thickness | 1.4 mm |
| Second intermediate resin layer | Composition | Ethylene-propylene rubber: 54 mass parts<br>Polypropylene: 40 mass parts<br>Styrene series thermoplastic elastomer: 6 mass parts<br>Calcium carbonate: 25 mass parts<br>Lubricant: 1 mass parts |
|  | Thickness | 200 μm |
|  | Degree of elasticity(X) | 310 N/mm$^2$ |
| Backing layer | Material | Polypropylene spunbonded fabric |
|  | Weight per unit area | 40 g/m$^2$ |
| X/Y |  | 2.2 |

TABLE 8

Example 8

|  |  |  |
|---|---|---|
| Surface resin layer | Composition | Triple layer structure PP/Olefin resin/PP (with printing on rear surface) |
|  | Thickness | 300 μm |
|  | Degree of elasticity(Y) | 316 N/mm$^2$ |
| First intermediate resin layer | Composition | Amorphous poly α-olefin resin: 24 mass parts<br>Ethylene-propylene rubber: 32 mass parts<br>Polypropylene: 44 mass parts<br>Calcium carbonate: 300 mass parts<br>Lubricant: 2 mass parts |
|  | Thickness | 1.4 mm |
| Second intermediate resin layer | Composition | Ethylene-propylene rubber: 24 mass parts<br>Polypropylene: 70 mass parts<br>Styrene series thermoplastic elastomer: 6 mass parts<br>Calcium carbonate: 25 mass parts<br>Lubricant: 1 mass parts |

TABLE 8-continued

Example 8

| | | |
|---|---|---|
| | Thickness | 200 μm |
| | Degree of elasticity(X) | 378 N/mm² |
| Backing layer | Material | Polypropylene spunbonded fabric |
| | Weight per unit area | 20 g/m² |
| X/Y | | 1.2 |

TABLE 9

Example 9

| | | |
|---|---|---|
| Surface resin layer | Composition | Single layer structure PP single layer (with printing on rear surface) |
| | Thickness | 300 μm |
| | Degree of elasticity(Y) | 800 N/mm² |
| First intermediate resin layer | Composition | Amorphous poly α-olefin resin: 24 mass parts Ethylene-propylene rubber: 32 mass parts Polypropylene: 44 mass parts Calcium carbonate: 300 mass parts Lubricant: 2 mass parts |
| | Thickness | 1.4 mm |
| Second intermediate resin layer | Composition | Ethylene-propylene rubber: 24 mass parts Polypropylene: 70 mass parts Styrene series thermoplastic elastomer: 6 mass parts Calcium carbonate: 25 mass parts Lubricant: 1 mass parts |
| | Thickness | 200 μm |
| | Degree of elasticity(X) | 950 N/mm² |
| Backing layer | Material | Polypropylene spunbonded fabric |
| | Weight per unit area | 40 g/m² |
| X/Y | | 1.2 |

COMPARATIVE EXAMPLE 1

A floor material was obtained in the same manner as Example 1 except that the thickness of the second intermediate resin layer was set to be 50 μm.

COMPARATIVE EXAMPLE 2

A floor material was obtained in the same manner as Example 1 except that the thickness of each layer was set to be a value shown in Table 11 and the thickness of the second intermediate resin layer 5 exceeds 50% of the total thickness of the three layers 2, 3 and 5.

COMPARATIVE EXAMPLE 3

A floor material was obtained in the same manner as Example 1 except for the conditions such as composition, thickness, etc. of each layer. These conditions are shown in Table 12. (In this Comparative Example, the filler amount with respect to the resin component of the second resin layer exceeds the upper limit of the specified range).

COMPARATIVE EXAMPLE 4

A floor material was obtained in the same manner as Example 1 except for the conditions such as composition, thickness, etc. of each layer. These conditions are shown in Table 13. (In this Comparative Example, the filler containing ratio with respect to the resin component of the second intermediate resin layer exceeds the filler containing ratio with respect to the resin component of the first intermediate resin layer).

COMPARATIVE EXAMPLE 5

A floor material was obtained in the same manner as Example 1 except for the conditions such as composition, thickness, etc. of each layer. These conditions are shown in Table 14. (In this Comparative Example, (In this Comparative Example, the thickness of the surface resin layer exceeds the upper limit of the specified range).

COMPARATIVE EXAMPLE 6

A floor material was obtained in the same manner as Example 1 except for the conditions such as composition, thickness, etc. of each layer. These conditions are shown in Table 15. (In this Comparative Example, the thickness of the surface resin layer is lower than the lower limit of the specified range).

COMPARATIVE EXAMPLE 7

A floor material was obtained in the same manner as Example 1 except that the contain ratio of calcium carbonate in the first intermediate resin layer was set to be the value shown in Table 16. (In this Comparative Example, the ratio is lower than the lower limit of the specified range).

COMPARATIVE EXAMPLE 8

A floor material was obtained in the same manner as Example 1 except that the contain ratio of calcium carbonate in the first intermediate resin layer was set to be the value shown in Table 17. (In this Comparative Example, the ratio exceeds the upper limit of the specified range).

COMPARATIVE EXAMPLE 9

A floor material was obtained in the same manner as Example 1 except that the second intermediate resin layer was omitted from the structure of the floor material.

TABLE 10

Comparative Example 1

| | | |
|---|---|---|
| Surface resin layer | Composition | Triple layer structure PP/Olefin resin/PP (with printing on rear surface) |
| | Thickness | 300 μm |
| | Degree of elasticity(Y) | 316 N/mm² |
| First intermediate resin layer | Composition | Amorphous poly α-olefin resin: 24 mass parts Ethylene- propylene rubber: 32 mass parts Polypropylene: 44 mass parts Calcium carbonate: 300 mass parts Lubricant: 2 mass parts |
| | Thickness | 1.4 mm |
| Second intermediate resin layer | Composition | Ethylene-propylene rubber: 24 mass parts Polypropylene: 70 mass parts Styrene series thermoplastic elastomer: 6 mass parts |

TABLE 10-continued

| | | Comparative Example 1 |
|---|---|---|
| | | Calcium carbonate: 25 mass parts |
| | | Lubricant: 1 mass parts |
| | Thickness | 50 μm |
| | Degree of elasticity(X) | 369 N/mm$^2$ |
| Backing layer | Material | Polypropylene spunbonded fabric |
| | Weight per unit area | 40 g/m$^2$ |
| X/Y | | 1.2 |

TABLE 11

| | | Comparative Example 2 |
|---|---|---|
| Surface resin layer | Composition | Triple layer structure PP/Olefin resin/PP (with printing on rear surface) |
| | Thickness | 200 μm |
| | Degree of elasticity(Y) | 190 N/mm$^2$ |
| First intermediate resin layer | Composition | Amorphous poly α-olefin resin: 24 mass parts Ethylene-propylene rubber: 32 mass parts Polypropylene: 44 mass parts Calcium carbonate: 300 mass parts Lubricant: 2 mass parts |
| | Thickness | 0.6 mm |
| Second intermediate resin layer | Composition | Ethylene-propylene rubber: 24 mass parts Polypropylene: 70 mass parts Styrene series thermoplastic elastomer: 6 mass parts Calcium carbonate: 25 mass parts Lubricant: 1 mass parts |
| | Thickness | 1.1 mm |
| | Degree of elasticity(X) | 235 N/mm$^2$ |
| Backing layer | Material | Polypropylene spunbonded fabric |
| | Weight per unit area | 40 g/m$^2$ |
| X/Y | | 1.2 |

TABLE 12

| | | Comparative Example 3 |
|---|---|---|
| Surface resin layer | Composition | Triple layer structure PP/Olefin resin/PP (with printing on rear surface) |
| | Thickness | 300 μm |
| | Degree of elasticity(Y) | 316 N/mm$^2$ |
| First intermediate resin layer | Composition | Amorphous poly α-olefin resin: 24 mass parts Ethylene-propylene rubber: 32 mass parts Polypropylene: 44 mass parts Calcium carbonate: 300 mass parts Lubricant: 2 mass parts |
| | Thickness | 1.1 mm |
| Second intermediate resin layer | Composition | Amorphous poly α-olefin resin: 24 mass parts Ethylene-propylene rubber: 32 mass parts Polypropylene: 44 mass parts Calcium carbonate: 250 mass parts Lubricant: 2 mass parts |
| | Thickness | 0.6 mm |
| | Degree of elasticity(X) | 416 N/mm$^2$ |

TABLE 12-continued

| | | Comparative Example 3 |
|---|---|---|
| Backing layer | Material | Polypropylene spunbonded fabric |
| | Weight per unit area | 40 g/m$^2$ |
| X/Y | | 1.3 |

TABLE 13

| | | Comparative Example 4 |
|---|---|---|
| Surface resin layer | Composition | Triple layer structure PP/Olefin resin/PP (with printing on rear surface) |
| | Thickness | 300 μm |
| | Degree of elasticity(Y) | 316 N/mm$^2$ |
| First intermediate resin layer | Composition | Amorphous poly α-olefin resin: 24 mass parts Ethylene-propylene rubber: 32 mass parts Polypropylene: 44 mass parts Calcium carbonate: 150 mass parts Lubricant: 2 mass parts |
| | Thickness | 1.1 mm |
| Second intermediate resin layer | Composition | Amorphous poly α-olefin resin: 24 mass parts Ethylene-propylene rubber: 32 mass parts Polypropylene: 44 mass parts Calcium carbonate: 190 mass parts Lubricant: 2 mass parts |
| | Thickness | 0.6 mm |
| | Degree of elasticity(X) | 345 N/mm$^2$ |
| Backing layer | Material | Polypropylene spunbonded fabric |
| | Weight per unit area | 40 g/m$^2$ |
| X/Y | | 1.1 |

TABLE 14

| | | Comparative Example 5 |
|---|---|---|
| Surface resin layer | Composition | Triple layer structure PP/Olefin resin/PP (with printing on rear surface) |
| | Thickness | 1,200 μm |
| | Degree of elasticity(Y) | 510 N/mm$^2$ |
| First intermediate resin layer | Composition | Amorphous poly α-olefin resin: 24 mass parts Ethylene-propylene rubber: 32 mass parts Polypropylene: 44 mass parts Calcium carbonate: 300 mass parts Lubricant: 2 mass parts |
| | Thickness | 0.5 mm |
| Second intermediate resin layer | Composition | Ethylene-propylene rubber: 14 mass parts Polypropylene: 80 mass parts Styrene series thermoplastic elastomer: 6 mass parts Calcium carbonate: 10 mass parts Lubricant: 1 mass parts |
| | Thickness | 1.2 mm |
| | Degree of elasticity(X) | 662 N/mm$^2$ |
| Backing layer | Material | Polypropylene s spunbonded fabric |
| | Weight per unit area | 40 g/m$^2$ |
| X/Y | | 1.3 |

TABLE 15

| Comparative Example 6 | | |
|---|---|---|
| Surface resin layer | Composition | Triple layer structure PP/Olefin resin/PP (with printing on rear surface) |
| | Thickness | 50 μm |
| | Degree of elasticity(Y) | 450 N/mm$^2$ |
| First intermediate resin layer | Composition | Amorphous poly α-olefin resin: 24 mass parts Ethylene-propylene rubber: 32 mass parts Polypropylene: 44 mass parts Calcium carbonate: 300 mass parts Lubricant: 2 mass parts |
| | Thickness | 1.1 mm |
| Second intermediate resin layer | Composition | Ethylene-propylene rubber: 14 mass parts Polypropylene: 80 mass parts Styrene series thermoplastic elastomer: 6 mass parts Calcium carbonate: 10 mass parts Lubricant: 1 mass parts |
| | Thickness | 300 μm |
| | Degree of elasticity(X) | 662 N/mm$^2$ |
| Backing layer | Material Weight per unit area | Polypropylene spunbonded fabric 40 g/m$^2$ |
| X/Y | | 1.5 |

TABLE 16

| Comparative Example 7 | | |
|---|---|---|
| Surface resin layer | Composition | Triple layer structure PP/Olefin resin/PP (with printing on rear surface) |
| | Thickness | 300 μm |
| | Degree of elasticity(Y) | 316 N/mm$^2$ |
| First intermediate resin layer | Composition | Amorphous poly α-olefin resin: 24 mass parts Ethylene-propylene rubber: 32 mass parts Polypropylene: 44 mass parts Calcium carbonate: 70 mass parts Lubricant: 2 mass parts |
| | Thickness | 1.4 mm |
| Second intermediate resin layer | Composition | Ethylene-propylene rubber: 24 mass parts Polypropylene: 70 mass parts Styrene series thermoplastic elastomer: 6 mass parts Calcium carbonate: 25 mass parts Lubricant: 1 mass parts |
| | Thickness | 200 μm |
| | Degree of elasticity(X) | 378 N/mm$^2$ |
| Backing layer | Material Weight per unit area | Polypropylene spunbonded fabric 40 g/m$^2$ |
| X/Y | | 1.2 |

TABLE 17

| Comparative Example 8 | | |
|---|---|---|
| Surface resin layer | Composition | Triple layer structure PP/Olefin resin/PP (with printing on rear surface) |
| | Thickness | 300 μm |
| | Degree of elasticity(Y) | 316 N/mm$^2$ |
| First intermediate resin layer | Composition | Amorphous poly α-olefin resin: 24 mass parts Ethylene-propylene rubber: 32 mass parts Polypropylene: 44 mass parts Calcium carbonate: 500 mass parts Lubricant: 2 mass parts |
| | Thickness | 1.4 mm |
| Second intermediate resin layer | Composition | Ethylene-propylene rubber: 24 mass parts Polypropylene: 70 mass parts Styrene series thermoplastic elastomer: 6 mass parts Calcium carbonate: 25 mass parts Lubricants 1 mass parts |
| | Thickness | 200 μm |
| | Degree of elasticity(X) | 378 N/mm$^2$ |
| Backing layer | Material Weight per unit area | Polypropylene spunbonded fabric 40 g/m$^2$ |
| X/Y | | 1.2 |

TABLE 18

| Comparative Example 9 | | |
|---|---|---|
| Surface resin layer | Composition | Triple layer structure PP/Olefin resin/PP (with printing on rear surface) |
| | Thickness | 300 μm |
| | Degree of elasticity(Y) | 316 N/mm$^2$ |
| First intermediate resin layer | Composition | Amorphous poly α-olefin resin: 24 mass parts Ethylene-propylene rubber: 32 mass parts Polypropylene: 44 mass parts Calcium carbonate: 300 mass parts Lubricant: 2 mass parts |
| | Thickness | 1.4 mm |
| Second intermediate resin layer | | None |
| Backing layer | Material Weight per unit area | Polypropylene spunbonded fabric 40 g/m$^2$ |

The following tests were conducted to each floor material obtained as mentioned above. The results are shown in Table 19.

<Wear Resistant Test>

In accordance with the friction test method for a building material and a construction structural portion by JIS A1453, the surface of each floor material was ground with a taper grinding test machine with a grinding ring on which a predetermined sandpaper was wound until the pattern layer (printed layer) of each floor material was destroyed. The number of rotation of the grinding ring was measured. The results are shown in Table 19. In this table, "⊚" denotes that the number of rotation exceeds 4,000, "○" denotes that the number of rotation is 2,000 to 4,000, and "X" denotes that the number of rotation is less than 2,000.

<Stain Resistant Test>

In accordance with the stain test method for a polymer molecule series stretched floor test method by JIS A1454, 2 mL of contamination material was dropped on the surface of each floor material and kept for 24 hours, then washed with water containing neutral detergent, then further washed with alcohol, then wiped off with gauze, then kept for 1 hour. Then, the changes of color, luster and blister of the portion on which the contamination material was dropped were visually observed. The results are shown in Table 19. In this Table, "⊙" denotes that no change was observed, and "X" denotes that at least one of changes was observed.

<Dimensional Stability Test>

In accordance with the length change test by heating for a polymer molecule series stretched floor test method by JIS A1454, after heating each floor material at 80° C. for 6 hours, each floor material was left indoors for 1 hour. Then, the rate of change to the length before heating was measured. The results are shown in Table 19. In this Table, "⊙" denotes that the rate of change is less than 0.1%, "○" denotes that the rate of change is 0.1 to 0.25%, and "X" denotes that the rate of change exceeds 0.25%.

<Workability Test>

In the test results shown in Table 19, "⊙" denotes that it is excellent in workability and good in fitting to a floor substrate (floor surface to be applied) and no joints can be recognized, "○" denotes that it is excellent in workability and good in fitting to a floor substrate, and no joint can be recognized, "△" denotes that it is good in workability, fits to a floor substance and joints can be slightly recognized, and "X" denotes that it is poor in workability and poor in fitting to a floor substrate, and joints can be easily recognized.

<Curvature Tightness Test>

In accordance with the curvature test of a tile carpet of JIS L4406, a floor material specimen (cut into 457.2 mm×457.2 mm) was placed on a stainless steel plate with a thickness of 3 mm specified by JIS G4305, kept horizontally for 24 hours in a standard state (20±2° C., 65±2% RH), then laid on a horizontal test rack, and then the magnitude of the gap between each specimen and the test table at the four corners of each specimen were measured. In Table 19, "⊙" denotes that the maximum absolute value of gaps between the four corner of each specimen and the test table was less than 0.1 mm, "○" denotes that the value exceeded 0.1 mm, but was less than 0.3 mm, "△" denotes that the value exceeded 0.3 mm, but was less than 0.5 mm, and "X" denotes that the value exceeded 0.5 mm.

<Adhesive Test>

In accordance with the adhesive strength test JIS A55336 of an adhesive for vinyl floor tiles/vinyl floor sheets, the adhesive strength of each floor was measured by using epoxy resin adhesive. In Table 19, "⊙" denotes that the adhesive strength exceeds 80 N/cm$^2$, "△" denotes that the adhesive strength is 70 to 80 N/cm$^2$, "X" denotes that the adhesive strength is less than 70 N/cm$^2$.

As is apparent from Table 8, the floor materials of Examples 1 to 9 of the present invention were excellent in wear resistance, stain resistance, dimensional stability, workability and curvature tightness and adhesiveness.

To the contrary, in the floor material of Comparative Example 1 in which the thickness of the second intermediate resin layer was less than the lower limit of the specified range, both the wear resistance and the curvature tightness were poor.

In the floor material of Comparative Example 2 in which the thickness of the second intermediate resin layer exceeded the upper limit of the specified range, both the dimensional stability and the curvature tightness were poor.

In the floor material of Comparative Example 3 in which the filler contained amount with respect to the resin ingredient of the second intermediate resin layer exceeded the upper limit of the specified range, both the workability and the curvature tightness were poor.

In the floor material of Comparative Example 4 in which the filler contained ratio of the second intermediate resin layer with respect to the resin ingredient of the second intermediate resin layer exceeded the filler contained ratio of the first intermediate resin layer with respect to the resin ingredient of the first intermediate resin layer, both the workability and the curvature tightness were poor.

In the floor material of Comparative Example 5 in which the thickness of the surface resin layer exceeded the upper limit of the specified range, the dimensional stability, the workability and the curvature tightness were poor.

In the floor material of Comparative Example 6 in which the thickness of the surface resin layer was lower than the lower limit of the specified range, the wear resistance was poor.

In the floor material of Comparative Example 7 in which the filler contained ratio in the first intermediate resin layer was lower than the lower limit of the specific range, the dimension stability was poor.

In the floor material of Comparative Example 8 in which the filler contained ratio in the first intermediate resin layer exceeded the upper limit of the specific range, both the workability and the curvature tightness were poor.

In the floor material of Comparative Example 9 in which the second intermediate resin layer was omitted from the structure of the floor material, the workability was poor.

Furthermore, an NBS combustion test and the flame proofness test (Fire Service Law) were performed against the floor material of Example 1. These results are shown in Table 20.

In the NBS combustion test method, a specimen is perpendicularly placed in a sealed smoke emitting box and burned while applying radiant heat from a heater in front of the specimen and also applying a flame of a burner. The rate

TABLE 19

|  | Example | | | | | | | | | Comparative Example | | | | | | | | |
| --- | --- | --- | --- | --- | --- | --- | --- | --- | --- | --- | --- | --- | --- | --- | --- | --- | --- | --- |
|  | 1 | 2 | 3 | 4 | 5 | 6 | 7 | 8 | 9 | 1 | 2 | 3 | 4 | 5 | 6 | 7 | 8 | 9 |
| Wear resistance | ⊙ | ○ | ⊙ | ⊙ | ⊙ | ⊙ | ⊙ | ⊙ | ⊙ | ⊙ | ○ | ⊙ | ⊙ | ⊙ | X | ⊙ | ⊙ | ⊙ |
| Stain resistance | ⊙ | ⊙ | ⊙ | ⊙ | ⊙ | ⊙ | ⊙ | ⊙ | ⊙ | ⊙ | ⊙ | ⊙ | ⊙ | ⊙ | ⊙ | ⊙ | ⊙ | ⊙ |
| Dimensional stability | ⊙ | ⊙ | ⊙ | ⊙ | ⊙ | ⊙ | ⊙ | ⊙ | ⊙ | ⊙ | X | ⊙ | ⊙ | X | ⊙ | X | ⊙ | ⊙ |
| Workability | ⊙ | ⊙ | ⊙ | ⊙ | ⊙ | △ | △ | ⊙ | ⊙ | X | △ | X | X | X | ⊙ | ⊙ | X | X |
| Curvature tightness | ⊙ | ⊙ | ⊙ | ⊙ | ⊙ | △ | △ | ⊙ | ⊙ | X | X | X | X | X | ⊙ | ⊙ | X | △ |
| Adhesive | ⊙ | ⊙ | ⊙ | ⊙ | ⊙ | ⊙ | ⊙ | ⊙ | △ | ⊙ | ⊙ | ⊙ | ⊙ | ⊙ | ⊙ | ⊙ | ⊙ | ⊙ | of light transmission of the smoke generated in the smoke emitting box is measured with a photoelectric tube. Then, the smoke density (Ds) is calculated from this rate of light transmission (T) using the following calculation formula: Ds=132log(100/T).

The Ds value and the maximum Ds value at the time of 4 minutes after the test start were calculated. Furthermore, the gas in the smoke emitting box was kept in a Teflon bag, and the generating gas was analyzed.

TABLE 20

| NBS Combustion Test | Smoking nature (Ds value) | 4 minutes later | 1 |
| --- | --- | --- | --- |
| | | Maximum | 119 |
| | Analysis of generated gases | CO | 100 ppm |
| | | HCN | 0 ppm |
| | | HCl | 0 ppm |
| | | HF | 0 ppm |
| | | $SO_2$ | 0 ppm |
| | | $NO + NO_2$ | 2 ppm |
| Flame Proofness Test | | | Pass |

Ds: Smoke Density

As will be apparent from Table 20, it is confirmed that the floor material according to the present invention is low in smoke generation at the time of burning and that poisonous gases are hardly generated.

According to the floor material of the present invention, since resin having no chlorine atom in chemical structure is used as resin materials, the floor material generates less smoke, less poisonous gases at the time of burning, which is excellent in burning safety and environment conservation. Furthermore, since the surface resin layer is made of resin and that the thickness of the surface resin layer is set to 100 μm or more, it is excellent in wear resistance and stain resistance. In addition, since the thickness of the surface resin layer is set to be 1,000 μm or less and that the content ratio of the filler in the second intermediate resin layer with respect to the resin ingredient of the second intermediate resin layer is smaller than the content ratio of the filler in the first intermediate resin layer with respect to the resin ingredient of the first intermediate resin layer, and that the thickness of the second intermediate resin layer is set to be 100 μm or more but 50% or less of a total thickness of three resin layers of the surface resin layer, the first intermediate resin layer and the second intermediate resin layer, the generation of down-curvature of the floor material can be effectively prevented, resulting in excellent workability.

Furthermore, since a certain amount of filler is contained in the first intermediate resin layer, excellent dimensional stability can be secured. Since it is excellent in dimensional stability as mentioned above, even in cases where the floor material is used as a floor material which especially requires excellent dimensional stability such as a homogeneous style, there is a merit that no insertion of glass nonwoven fabric is required. Furthermore, since a backing layer made of a fibrous fabric is laminated at the lower surface side of the second intermediate resin layer, the floor material can be disposed while keeping sufficient adhesive strength against the floor substrate. In addition, since it is not required to contain plasticizer, the specific odor will not be emitted and that dull deposits will not gradually generate on the surface of the floor material, resulting in excellent durability.

Furthermore, in cases where the surface resin layer is a monolayer structure containing polypropylene resin as a main resin ingredient or a lamination structure in which at least the uppermost surface layer contains polypropylene resin as a main resin ingredient, the wear resistance and the stain resistance can be further enhanced.

Furthermore, in cases where polypropylene resin is employed as olefin series resin in the above structure, the wear resistance and the stain resistance can be further enhanced.

In cases where the following formula is satisfied: 10.0<X/Y≦2.0, where "X" is a degree of elasticity of the second intermediate resin layer, and "Y" is a degree of elasticity of the surface resin layer, the generation of down-curvature of the floor material can be prevented more effectively, and the floor material becomes a slightly up-curved state, which further improves the workability.

Especially, in cases where the following formula is satisfied: 1.1≦X/Y≦1.5, the generation of down-curvature of the floor material can be prevented assuredly, and the floor material becomes an appropriate up-curved state, which further improves the workability.

In cases where the weight per unit area of the backing layer is 30 to 100 g/m², the adhesive strength between the floor material and the mounting floor substrate can be secured assuredly.

While illustrative embodiments of the present invention have been described herein, the present invention is not limited to the various preferred embodiments described herein, but includes any and all embodiments having modifications, omissions, combinations (e.g., of aspects across various embodiments), adaptations and/or alterations as would be appreciated by those in the art based on the present disclosure. The limitations in the claims are to be interpreted broadly based the language employed in the claims and not limited to examples described in the present specification or during the prosecution of the application, which examples are to be construed as non-exclusive. For example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited.

What is claimed is:

1. A non-halogen series floor material, comprising:
   a first intermediate resin layer containing filler of 100 to 400 mass parts with respect to resin ingredient of 100 mass parts, said resin ingredient consisting essentially of resin having no chlorine atom in chemical structure;
   a surface resin layer integrally formed at an upper surface side of said first intermediate resin layer, said surface resin layer containing resin having no chlorine atom in chemical structure and having a thickness of 100 to 1,000 μm;
   a second intermediate resin layer integrally formed at a lower surface side of said first intermediate resin layer, said second lntermediate resin layer containing resin having no chlorine atom in chemical structure and filler of 0 to 200 mass parts with respect to resin ingredient of 100 mass parts; and
   a backing layer integrally formed at a lower surface side of said second intermediate resin layer, said backing layer being formed of a fibrous fabric constituted by fibers containing resin having no chlorine atom in chemical structure, wherein a content ratio of said filler in said second intermediate resin layer with respect to said resin ingredient of said second intermediate resin layer is smaller than a content ratio of said filler in said first intermediate resin layer with respect to said resin ingredient of said first intermediate resin layer, wherein a thickness of said second intermediate resin layer is 100 μm or more, and wherein a thickness of said second intermediate resin layer is 50% or less of a total thickness of three resin layers of said surface resin layer, said first intermediate resin layer and said second intermediate resin layer, and wherein the following formula is satisfied:

$$1.0 < x/y \leq 2.0$$

where "X" is a degree of elasticity of said second intermediate resin layer, and "Y" is a degree of elasticity, of said surface resin layer, whereby edge sides of the floor material are curved downwardly with respect to a central portion of the floor material.

2. The non-halogen series floor material as recited in claim 1, wherein said surface resin layer is a monolayer structure containing olefin series resin as a main resin ingredient.

3. The non-halogen series floor material as recited in claim 1, wherein said surface resin layer is a monolayer structure containing polypropylene resin as a main resin ingredient.

4. The non-halogen series floor material as recited in claim 1, wherein said surface resin layer is a lamination structure in which at least an uppermost surface layer contains olefin series resin as a main resin ingredient.

5. The non-halogen series floor material as recited in claim 1, wherein said surface resin layer is a lamination structure in which at least an uppermost surface layer contains polypropylene series resin as a main resin ingredient.

6. The non-halogen series floor material as recited in claim 1, wherein a thickness of said surface resin layer is 200 to 600 μm.

7. The non-halogen series floor material as recited in claim 1, wherein said first intermediate resin layer contains pattern-forming members capable of being seen via said surface resin layer.

8. The non-halogen series floor material as recited in claim 1, wherein said first intermediate resin layer contains coloring pigment capable of being seen via said surface resin layer.

9. The non-halogen series floor material as recited in claim 8, wherein said coloring pigment is contained by 0.1 to 5 mass % with respect to an entire amount of said first intermediate resin layer.

10. The non-halogen series floor material as recited in claim 1, wherein said first intermediate resin layer contains pattern-forming members and coloring pigment capable of being seen via said surface resin layer.

11. The non-halogen series floor material as recited in claim 1, wherein the following formula is satisfied: $1.1 \leq X/Y \leq 1.5$ where "X" is a degree of elasticity of said second intermediate resin layer, and "Y" is a degree of elasticity of said surface resin layer.

12. The non-halogen series floor material as recited in claim 1, wherein said second intermediate resin layer contains filler of 0 to 100 mass parts with respect to resin ingredient of 100 mass parts.

13. The non-halogen series floor material as recited in claim 1, wherein a content ratio of said filler in said second intermediate resin layer with respect to said resin ingredient of said second intermediate resin layer is less than one half of a content ratio of said filler in said first intermediate resin layer with respect to said resin ingredient of said first intermediate resin layer.

14. The non-halogen series floor material as recited claim 1, wherein a thickness of said second intermediate resin layer is 200 μm or more, but 30% or less of a total thickness of three resin layers of said surface resin layer, said fast intermediate resin layer and said second intermediate resin layer.

15. The non-halogen series floor material as recited in claim 1, wherein a total thickness of said first intermediate resin layer and said second intermediate resin layer is 1 to 5 mm.

16. The non-halogen series floor material as recited in claim 1, wherein a total thickness of said first intermediate resin layer and said second intermediate resin layer is 1.5 to 4 mm.

17. The non-halogen series floor material as recited in claim 1, wherein a weight per unit area of said backing layer is 30 to 100 g/m$^2$.

18. The non-halogen series floor material as recited in claim 1, further comprising a printing layer integrally formed on a lower surface of said surface resin layer.

19. A non-halogen series floor material, comprising:

a first intermediate resin layer containing filler of 100 to 400 mass parts with respect to resin ingredient of 100 mass parts, said resin ingredient consisting essentially of resin having no chlorine atom in chemical structure;

a surface resin layer integrally formed at an upper surface side of said first intermediate resin layer, said surface resin layer containing resin having no chloride atom in chemical structure and having a thickness of 100 to 1,000 μm;

a second intermediate resin layer integrally formed at a lower surface side of said first intermediate resin layer, said second intermediate resin layer containing resin having no chloride atom in chemical structure and filler of 0 to 200 mass parts with respect to resin ingredient of 100 mass parts;

and a backing layer integrally formed at a lower surface side of said second intermediate resin layer, said being layer being formed of a fibrous fabric constituted by fibers containing resin having no chloride atom in chemical structure, wherein a content ratio of said filler in said second intermediate resin layer with respect to said resin ingredient of said second intermediate resin layer is smaller than a content ratio of said filler in said first intermediate resin layer with respect to said resin ingredient of said first intermediate resin layer, wherein a thickness of said second intermediate resin layer is 100 μm or more, and wherein a thickness of said second intermediate resin layer is 50% or less of a total thickness of three resin layers of said surface resin layer, said first intermediate resin layer and said second intermediate resin layer, wherein said surface resin layer is a monolayer structure containing olefin series resin as a main resin ingredient or a lamination structure in which at least an uppermost surface layer contains olefin series resin as a main resin ingredient, wherein the following formula is satisfied:

$$1.0 < X/Y \leq 2.0$$

where "X" is a degree of elasticity of said second intermediate resin layer, and "Y" is a degree of elasticity of said surface resin layer, whereby edge sides of the floor material are curved downwardly with respect to a central portion of the floor material, and wherein a weight per unit area of said backing layer is 30 to 100 g/m$^2$.

20. A non-halogen series floor material, comprising;
a first intermediate resin layer containing filler of 100 to 400 mass parts with respect to resin ingredient of 100 mass parts, said resin ingredient consisting essentially of resin having no chlorine atom in chemical structure;
a surface resin layer integrally formed at an upper surface side of said first intermediate resin layer, said surface resin layer containing resin having no chloride atom in chemical structure and having a thickness of 200 to 600 μm;
a second intermediate resin layer integrally formed at a lower surface side of said first intermediate resin layer, said second intermediate resin layer containing resin having no chloride atom in chemical structure and filler of 0 to 200 mass parts with respect to resin ingredient of 100 mass parts; and
a backing layer integrally foamed at a lower surface side of said second intermediate resin layer, said backing layer being formed of a fibrous fabric constituted by fibers containing resin having no chloride atom in chemical structure, wherein a content ratio of said filler in said second intermediate resin layer with respect to said resin ingredient of said second intermediate resin layer is one half or less of a content ratio of said filler in said first intermediate resin layer with respect to said resin ingredient of said first intermediate resin layer, wherein a thickness of said second intermediate resin layer is 200 μm or more, and wherein a thickness of said second intermediate resin layer is 30% or less of a total thickness of three resin layers of said surface resin layer, said first intermediate resin layer and said second intermediate resin layer, wherein a total thickness of two layers of said first intermediate resin layer and said second intermediate resin layer is 1 to 5 mm, wherein said surface resin layer is a monolayer structure containing polypropylene resin as a main resin ingredient or a lamination structure in which at least an uppermost surface layer contains polypropylene resin as a main resin ingredient, wherein the following formula is satisfied:

$$1.1 \leq X/Y \leq 1.5$$

where "X" is a degree of elasticity of said second intermediate resin layer; and "Y" is a degree of elasticity of said surface resin layer, whereby edge sides of the floor material are curved downwardly with respect to a central portion of the floor material and wherein a weight per unit area of said backing layer is 30 to 100 $g/m^2$.

* * * * *